United States Patent [19]

Neckermann et al.

[11] 4,356,060
[45] Oct. 26, 1982

[54] INSULATING AND FILLER MATERIAL COMPRISING CELLULOSE FIBERS AND CLAY, AND METHOD OF MAKING SAME FROM PAPER-MAKING WASTE

[76] Inventors: Edwin F. Neckermann, 3004 Duke, Kalamazoo, Mich. 49008; Joseph F. Wooding, Rte. 1, Box 107-0, Grand Junction, Mich. 49056

[21] Appl. No.: 231,963

[22] Filed: Feb. 6, 1981

Related U.S. Application Data

[63] Continuation-in-part of Ser. No. 74,718, Sep. 12, 1979, abandoned.

[51] Int. Cl.³ .............................................. D21F 1/66
[52] U.S. Cl. .............................. 162/181.6; 162/189; 162/DIG. 9
[58] Field of Search .................... 162/4, 189, 190, 191, 162/181 R, 181 D, DIG. 9, 181.1, 181.6; 210/928

[56] References Cited

U.S. PATENT DOCUMENTS

| 3,188,751 | 6/1965 | Sutton | 162/DIG. 9 |
| 3,895,998 | 7/1975 | Haywood et al. | 162/DIG. 9 |
| 3,897,301 | 7/1975 | Bauman et al. | 162/DIG. 9 |

FOREIGN PATENT DOCUMENTS

| 1290378 | 3/1962 | France | 162/DIG. 9 |
| 48-35354 | 10/1973 | Japan | 162/DIG. 9 |

Primary Examiner—Peter Chin
Attorney, Agent, or Firm—Burmeister, York, Palmatier, Hamby & Jones

[57] ABSTRACT

A soft fluffy light weight substance comprising cellulose fibers and clay suitable as a filler and insulatng material, which is dispersible and absorbent in oil but which is not dispersible or absorbable in water, is made from paper making sludge by heating the sludge with mechanical agitation at about 350° F. to evaporate all water therefrom and convert the product to lipophilic granules which are then milled in a hammer mill and forced through a screen of 3/64–5/64 inch mesh.

9 Claims, 1 Drawing Figure

PAPER-MAKING WASTE:

CELLULOSE FIBER, WATER, CLAY.

```
┌─────────────────────────┐
│  DRYING AT 350° F.      │
│  WITH AGITATION         │
└─────────────────────────┘
```

HARD WATER-FREE AGGLOMERATE

```
┌─────────────────────────┐
│   MILLING WITH          │
│   HAMMER MILL           │
│ THROUGH 3/64 - 5/64 INCH│
│   MESH SCREEN           │
└─────────────────────────┘
```

SOFT FLUFFY WATER-FREE AGGREGATE:

CELLULOSE FIBERS HAVING
FINE PARTICLES OF CLAY ENTRAPPED THEREON.

INSULATING AND FILLER MATERIAL COMPRISING CELLULOSE FIBERS AND CLAY, AND METHOD OF MAKING SAME FROM PAPER-MAKING WASTE

CROSS REFERENCE TO RELATED APPLICATION

This application is a continuation-in-part of our co-pending application Ser. No. 74,718, filed Sept. 12, 1979 now abandoned.

FIELD OF INVENTION

The invention relates to a composition comprising cellulose fibers and clay; suitable for use as an insulating material and as a filler. The invention includes a process of making such product from paper-making waste.

PRIOR ART

It is well known in the art to make a dewatered sludge from the white water slurry of a paper making machine by partially removing the water from the slurry by filtering, centrifuging or by air drying at atmospheric temperatures. In French Pat. No. 1,290,378, waste products from the manufacture of paper are dried at some unspecified temperature to an unspecified water content and then the fibers are separated by crushing. This material may be dispersed in a resin aqueous emulsion, according to the French patent, and thus is water dispersible and water absorbent unlike the product obtained by applicants' process which is not water dispersible and water absorbent but is oil dispersible and absorbent. In Japanese patent publication No. SHO 48-35354, published Oct. 27, 1973, the sludge from used paper pulp liquor is mixed with fixing agents or adhesives and other ingredients. It does not show any grinding or milling of dried material to a powder, but appears to show some sort of extrusion of paste. Later in the process, the product is dried to a minimum water content of 3% which would give a water absorbent product unlike applicants' water-free product which does not absorb water.

SUMMARY OF INVENTION

A primary object of this invention is to provide an inexpensive, low density insulation and filler material from paper-making wastes, which is a water repelling, non-water dispersible, oil absorbing and oil dispersible product, thus making it especially satisfactory as an asbestos replacement.

In accordance with this invention, the paper-making sludge obtained by removing most of the water from the waste white water slurry of a paper-making machine and which comprises cellulose and clay, especially kaolin clay, is heated while agitating the sludge at a temperature and for a time sufficient to remove substantially all of the water and to convert the sludge mixture to lipophilic or hydrophobic granules that are nondispersible and nonabsorbable in water and dispersible and absorbable in oil. A suitable temperature and time for carrying out the process is approximately 350° F. on the sludge mixture for 10 minutes after substantially all the water has evaporated. A satisfactory temperature range is 300° F. to 500° F. although temperatures from substantially above 212° F. up to those of destroying the cellulose may be used. Suitably the sludge is heated on a flat bed conveyor using direct gas fired flame with continuous operation at 1000 pounds per hour with continual mechanical agitation such as with rotary knives to break up the dried sludge as it forms. The product so obtained is hard, dry ($\frac{1}{2}$% or less of free water) and in the form of granules. This product is then milled, preferably in a hammer mill, and forced out of the mill through a minus 5/64 inch mesh exit screen, preferably through 3/64–5/64 mesh screen, by, for example, negative air pressure and the action of the hammers rotating at 3600 revolutions per minute. The milling breaks the clay into extremely fine particles, such as −200 mesh U.S. Series.

The milled product may be conveyed from the mill by an air stream or other conveyor means and may be loaded into bags. As obtained from the mill, it is in the form of particulate soft fluffy aggregations of, for example, 1/16″ diameter, but on pressing it will form loosely matted masses or it can be pressed into batts. However, the matted product will readily break down into aggregates on stirring if such are desired.

The milled cellulose fiber-clay composition of this invention may contain a small proportion, such as for example, 10% of loose or discreet finely divided clay particles, but to a large extent the clay particles are firmly entrapped on the cellulose fibers.

The preferred clay material is kaolin, although any type of clay is suitable; but the clay used in major amount in paper making waste is kaolin, sometimes called china clay. There also may be present minor amounts of minerals such as $TiO_2$ and $Fe_2O_3$ as well as CaO, MgO, phosphates and sulfates.

The composition of this invention may be used as a substitute for asbestos to impart strength to weak materials. It may also be used as a substitute for asbestos for insulation where it is not solely exposed to very high temperatures for lengthy periods, such as for example, it may be wrapped around steam pipes; also it may be used in insulating paints or in asphalt formulations, such as asphalt roofing cement.

Its flammability is low. It burns only while directly in external flame; the flame will not spread and is self-extinguishing. Tests showed that the composition would withstand temperatures of 600° F. and would not ignite.

The product is also useful as a filler for molded plastics, and an insulator for construction of buildings. It may be used for making wallboard by incorporating a binder such as gypsum or phosphoric acid in the mixture and hot pressing.

The proportion of cellulose fibers to clay may vary, but for resistance to flame the preferred proportion of clay is at least 30% by weight up to about 80% with 70-20% of cellulose fibers. With a higher amount of clay and lower cellulose fiber content there is less strength. Higher proporptions of cellulose fibers may be present to obtain lower density but at the sacrifice of flame resistance.

In paper making the kaolin content of the pulp used to make paper is rarely, if ever, above 2% of the aqueous mixture of cellulose fibers and kaolin, but it was found that the waste product of paper making contained a much higher content of kaolin. This made it possible to use a waste paper-making product without adding kaolin to it; a useful and valuable discovery. For some types of paper, however, the amount of kaolin or loading material is so low that kaolin is frequently added during milling.

The cellulose fibers in the composition used for the milling preferably have a length of 1/16" or less. They remain this length or slightly shorter after milling, but when matted in the dry composition, they are substantially separated by the milling.

The product, as above stated, is lipophilic, that is, water nondispersible—oil dispersible. However, water dispersibility may be achieved by the addition of surfactants.

BRIEF DESCRIPTION OF DRAWING

In order to facilitate the understanding of the present invention, reference is made to the appended drawing. The drawing is a block schematic diagram of the preferred process of the invention.

DESCRIPTION OF PREFERRED EMBODIMENT

The following example is used to illustrate the invention.

EXAMPLE 1

Paper-making sludge containing 55-60% by weight of water was continuously placed on a steel mesh flat bed conveyor and heated, while being continuously agitated by rotary steel knives, to a temperature of 350° F., the bed being continuously moved at a speed of 1000 pounds per hour. The sludge on the conveyor was heated by direct gas fired flame. The lipophilic granules so obtained from the conveyor were placed in a 75 horsepower hammer mill rotating at 3600 revolutions per minute and having a 1/16 inch exit screen. The product forced through the screen during hammer milling was a soft, fluffy light weight lipophilic material. It had a bulking factor of 0.4 relative to 1.0 for the same grade of asbestos. The exposure to workers using this material was 40% compared to asbestos. The product was completely free of water, other than chemically combined water, having a moisture content according to our measurements of zero percent. The lipophilic product is highly advantageous for use as an insulating filler in aluminized asphalt roofing cement and the like, in that the product is readily dispersible in the asphalt, is water-free and thus does not cause degradation of the roofing cement, and does not absorb moisture when the cement is in place on a roof.

Prior products having a higher moisture content, such as 3% and higher, will absorb moisture causing mold formation and moisture degradation of finished products.

We claim:

1. A method of making a low density filler and insulating material from sludge comprising a mixture of cellulose fibers and clay obtained by partially removing water from the white water slurry of a paper-making machine which comprises heating and agitating said sludge mixture at a temperature of at least 300° F. but below the temperature at which the destruction of the cellulose fibers takes place, and for a time sufficient to convert the sludge mixture to granules that are substantially non dispersible and substantially non absorbable in water and milling said granules while forcing said granules through a $-5/64$ inch mesh screen.

2. A method in accordance with claim 1 in which the sludge mixture after substantially complete evaporation of its water by the heating is further heated within said temperature range for a period of at least 10 minutes.

3. A method in accordance with claim 1 in which the sludge is continuously fed to and carried on a moving conveyor and directly heated by a gas flame.

4. A method in accordance with claim 1 in which the milling is carried out in a hammer mill.

5. A soft light weight filler and insulating product comprising a mixture of cellulose fibers and particles of clay in the proportion of 30% to 80% clay and 70% to 20% cellulose fibers, the clay having a particle size of $-200$ mesh, said mixture being substantially water-free and being dispersible in oil and being oil-absorbable, but not substantially being dispersible in water or water-absorbable, said product being obtained by the process of claim 1.

6. A method of making a product from white water paper-making sludge which product is suitable by milling to produce a filler and insulating material which method comprises removing water from white water paper-making sludge to first produce a substantially dry water absorbable mixture of cellulose fibers and clay, and heating said mixture at a temperature of 300° F.–500° F. for a time sufficient to convert the water absorbable mixture to a substantially water free material which is dispersible in oil and substantially not water absorbable.

7. A method in accordance with claim 1 in which the temperature is within the range of 300° F.–500° F.

8. A method in accordance with claim 1 in which the temperature is approximately 350° F.

9. A method in accordance with claim 1 in which the clay of the aggregate obtained by the heating is crushed to a particle size of $-200$ mesh.

* * * * *